G. AMBORN.
BORING TOOL HOLDER.
APPLICATION FILED DEC. 10, 1915.
1,217,895.
Patented Mar. 6, 1917.
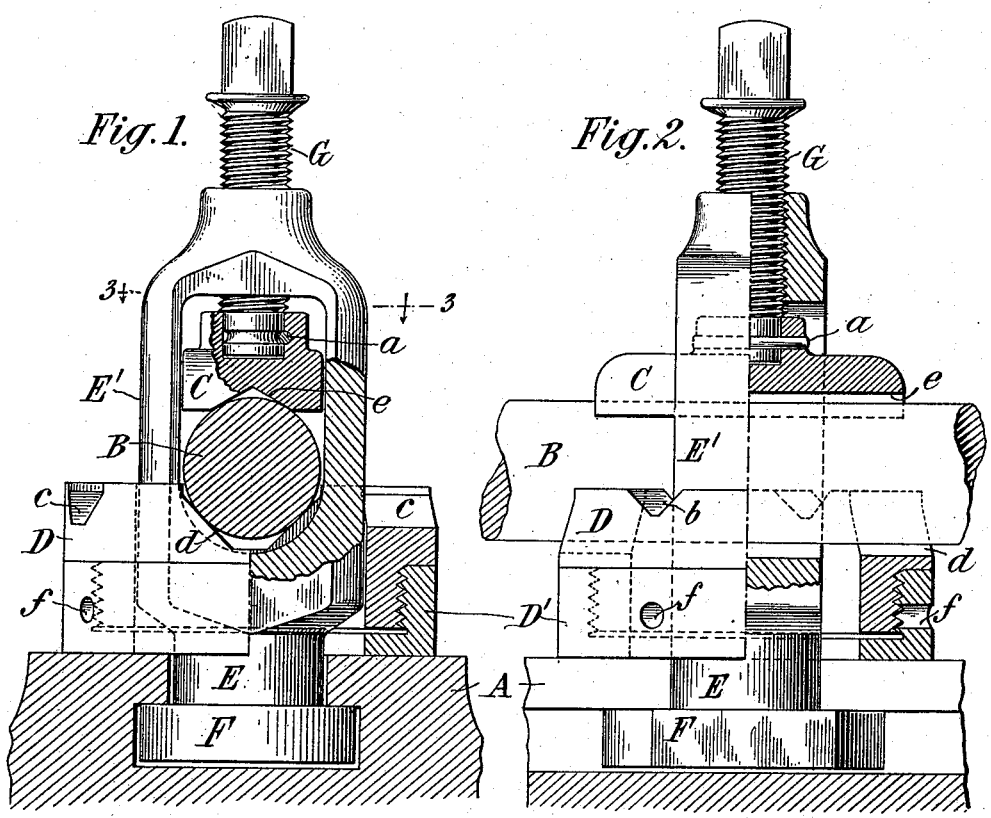
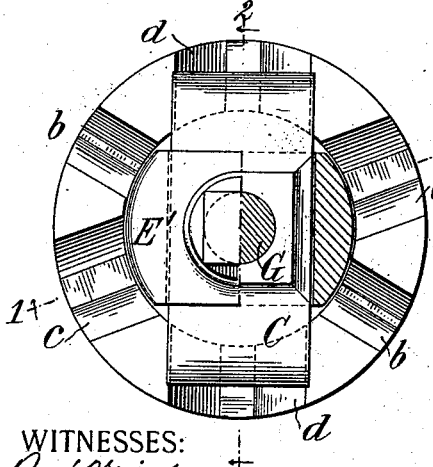
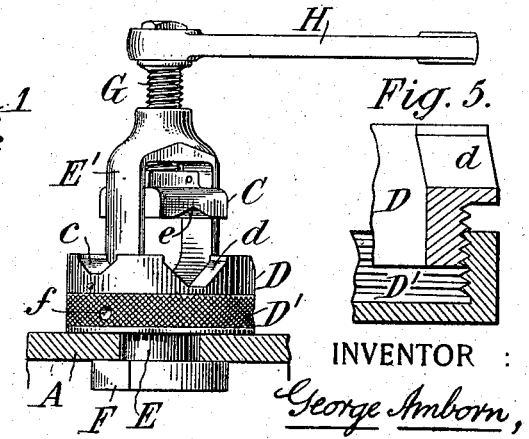
WITNESSES:
INVENTOR:
George Amborn,
By Attorneys,

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

BORING-TOOL HOLDER.

1,217,895.      Specification of Letters Patent.      Patented Mar. 6, 1917.

Application filed December 10, 1915. Serial No. 66,066.

*To all whom it may concern:*

Be it known that I, GEORGE AMBORN, a citizen of the United States of America, residing at Chapinville, in the county of Litchfield and State of Connecticut, have invented certain new and useful Improvements in Boring-Tool Holders, of which the following is a specification.

This invention relates to holders for boring tools used in lathes. The invention is applicable also to the holding of other tools for other uses.

In tool holders of this class the boring bar is held in a clamp which in turn is fastened to the slide rest or other suitable support which commonly has a T-slot engaged by a head at the base of the tool holder. The particular construction of such tool holders as heretofore constructed upon which the present invention is an improvement, comprises upper and lower jaws having radial notches of different sizes for holding different sized boring bars; with a central post carrying at its lower end a head for engaging the T-slot of the slide rest, slotted at its middle part to straddle the boring bar, and having its upper end threaded to receive a nut by which the jaws are forced down against the slide rest, thereby both clamping the tool and fastening the holder in place.

The present invention provides an improved construction whereby a greater range in the sizes of boring bars that may be held by the tool holder is admissible, and whereby the construction is otherwise improved.

Figure 1 of the accompanying drawings is a sectional elevation of the tool holder in use, showing the slide rest and boring bar in transverse section, and showing the right hand half of the tool holder partly in transverse section, the section being partly oblique on the plane of the line 1—1 in Fig. 3;

Fig. 2 is a sectional elevation viewed at right angles to Fig. 1 showing the boring bar in elevation, the right hand half of the holder being in vertical section on the plane of the line 2—2 in Fig. 3;

Fig. 3 is a plan of the tool holder alone (the boring bar and slide rest being omitted) partly in horizontal section on the plane of the line 3—3 in Fig. 1;

Fig. 4 is an oblique elevation of the tool holder on a smaller scale, the slide rest being shown in section and the boring bar omitted;

Fig. 5 is a fragmentary vertical section corresponding to the right hand half of Fig. 1 and showing the lower clamping jaw partly lifted by adjustment.

In the drawings, A designates any usual slide rest having the usual T-slot or any other support for the tool holder, and B designates the boring bar to be held. The holder comprises an upper clamping jaw C and a lower clamping jaw D provided with suitable notches for receiving the boring bar. The jaw D is made in two parts, its lower section D' resting directly on the slide rest. A clamping post E is provided having at its bottom a head F engaging the T-slot. The post extends up through the lower jaw D, being widened and slotted to straddle or embrace the boring bar, the slotted portion forming a stirrup E'. Above the slot the post is formed as a boss having a threaded bore which receives a clamping screw G. The upper jaw C is formed as a saddle confined within the slot of the post and engaged directly by the lower end of the screw G. The upper jaw and screw are preferably swiveled together as shown, a pin $a$ being inserted through a bore in the jaw and engaging a groove in the reduced end portion of the screw, so that as the screw is run up the upper clamping jaw will be lifted.

The lower clamping jaw D is made annular, its inner circumference or bore being sufficiently large to receive the enlarged or stirrup portion of the post within it, and so that when in place the jaw D may be turned around the post to any position. This lower jaw has a plurality of radial notches for receiving boring bars of different sizes, these notches in the construction shown being three in number and lettered $b$ $c$ and $d$ respectively. The upper jaw has a single notch $e$ which is adapted to engage a bar of any size.

In use, after the tool holder has been put in place on the slide rest, the lower jaw D is turned to bring into position that one of its notches which is best adapted to hold the particular size of boring bar that is to be used, and the boring bar is then inserted through the slot in the post and clamped between the jaws by screwing down the screw G.

The lower jaw D is made in two parts or sections vertically adjustable whereby the upper or notched section may be lifted or lowered. The lower section D', which constitutes an annular collar, is for this purpose adapted to rotate, and the two are formed with reciprocal inclines whereby such rotation will impart the desired up or down movement to the upper section. For this purpose the simplest construction is that of a screwthread as shown. To facilitate turning the lower section or collar, it is preferably knurled on its exterior, as shown in Fig. 4, and in addition it may be provided with radial holes *f* to receive a pin or key for turning it. In Fig. 5 the upper section is shown as having been elevated by such turning of the lower section.

The described construction of the lower jaw whereby its active portion may be raised or lowered, has several advantages. It is desirable to make the tool holder so that it may receive a variety of sizes of boring bars; it is, however, impracticable to provide the lower jaw with more than three sizes of notches as shown, but by making the lower jaw adjustable up or down, the range of sizes which may be engaged is increased to cover all sizes intermediate of a maximum and minimum which the tool holder can take. The boring bar can also be set higher or lower as occasion may require, which for some kinds of work is a very important advantage.

For turning the screw G it is preferable to provide a separate wrench or key, as shown at H in Fig. 4.

It will be observed that the angular notches *b e d* are of different sizes, having such relation to each other that any size of round bar within the extreme limits of capacity of the holder will enter with a suitable fit into one or another of these notches; also that the angular shape of the notches is such that they are adapted to receive not only round bars but also hexagon and octagon bars, these being standard commercial shapes of tool steels.

The invention is not limited to the precise construction shown, but is susceptible within the scope of the claims of a considerable degree of variation or modification in matters of construction and proportion, and to adapt it to a variety of different uses.

For convenience, the tool holder has been shown and described as standing in an upright or vertical position, but it is equally adapted to use in other locations where it may stand horizontally or obliquely, or be vertically inverted. The expressions in the description and claims referring to the location of the parts are therefore to be understood as relative, and to apply literally only when the holder is in the position shown.

The invention being applicable to the holding of other tools than boring tools, it will be understood that when applied to such other uses the expressions used in the description and claims referring to boring tools are to be understood to include such other tools as the tool holder may be associated with.

I claim as my invention:—

1. A boring tool holder comprising upper and lower clamping jaws and clamping means for forcing them together, the upper jaw being non-rotatable and having a single notch and the lower jaw having multiple angular notches of different sizes, each notch adapted to receive different sizes of boring bars, and rotatable to bring either notch into coincidence with the upper jaw.

2. A boring tool holder comprising upper and lower clamping jaws and clamping means for forcing them together, the upper jaw being non-rotatable and having a single notch and the lower jaw having multiple angular notches of different sizes, each notch adapted to receive different sizes of boring bars, and rotatable to bring either notch into coincidence with the upper jaw, and means for raising or lowering the lower jaw.

3. A boring tool holder comprising a central post having a slot for receiving the boring bar, an upper clamping jaw confined within said slot and projecting beyond the post, and a lower clamping jaw inclosing and rotatable around said post and having a plurality of angular notches of different sizes, and clamping means for forcing said jaws together.

4. A boring tool holder comprising a central post having a bottom head for engaging the T-slot in a slide rest, and having a slot for receiving the boring bar, an upper clamping jaw confined within said slot and a lower clamping jaw inclosing and rotatable around said post and having multiple angular notches of different sizes, and a clamping screw engaging said post and the upper jaw for forcing the jaws together.

5. A boring tool holder comprising a central post having a slot for receiving the boring bar, an upper clamping jaw movable within said slot, projecting beyond said slot at both ends, and having an angular engaging face, and a lower clamping jaw, inclosing and rotatable around said post, and having a plurality of angular notches of different sizes, said notches adapted to receive and firmly seat either a round or polygonal bar, with means for raising or lowering the lower clamping jaw, and clamping means engaging said post and the upper jaw for forcing the latter down.

6. A boring tool holder comprising a central post, having a vertical slot for receiving the boring bar, an upper jaw movable in said slot and having an angular face for engaging the bar, a lower jaw encircling the post, having a plurality of angular notches and adjustable to bring either notch opposite the upper jaw, said notches being of different sizes and coöperating with the angular faces of the upper jaw to receive each a variety of sizes of bars, and by bringing one or other notch into use to receive any size of bar within the extreme limits of the capacity of the holder, means for raising or lowering the lower jaw to bring the bar to a required level, and means for forcing the upper jaw against the lower jaw to clamp the bar.

In witness whereof, I have hereunto signed my name in the presence of two subscribing witnesses.

GEORGE AMBORN.

Witnesses:
WILLIAM J. CAMPBELL,
ROBERT H. ADAMS.